(12) United States Patent
Takano (10) Patent No.: US 8,803,707 B2
(45) Date of Patent: Aug. 12, 2014

(54) PARKING ASSISTANCE SYSTEM AND PARKING ASSISTANCE METHOD

(75) Inventor: Teruhisa Takano, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 519 days.

(21) Appl. No.: 12/997,052

(22) PCT Filed: Jun. 9, 2009

(86) PCT No.: PCT/JP2009/060537
§ 371 (c)(1),
(2), (4) Date: Dec. 9, 2010

(87) PCT Pub. No.: WO2009/151053
PCT Pub. Date: Dec. 17, 2009

(65) Prior Publication Data
US 2011/0095910 A1    Apr. 28, 2011

(30) Foreign Application Priority Data

Jun. 10, 2008  (JP) .................................. 2008-151473

(51) Int. Cl.
*G08G 1/017* (2006.01)
(52) U.S. Cl.
USPC ......... 340/937; 340/938; 340/932.2; 348/116
(58) Field of Classification Search
CPC ............ B62D 15/027; B62D 15/0275; B62D 15/028; B62D 15/029; B60R 2300/105; B60R 2300/202; B60R 2300/207; B60R 2300/303; B60R 2300/304; B60R 2300/305
USPC ............. 340/932.2, 937, 938; 701/41, 1, 207, 701/211; 348/48, 118, 113, 116; 382/104
See application file for complete search history.

(56) References Cited

U.S. PATENT DOCUMENTS

| | | | |
|---|---|---|---|
| 6,483,442 B2 | 11/2002 | Shimizu et al. |
| 6,654,670 B2 | 11/2003 | Kakinami et al. |
| 7,277,123 B1 | 10/2007 | Okamoto et al. |
| 7,295,227 B1 | 11/2007 | Asahi et al. |
| 7,363,130 B2 |  4/2008 | Sakakibara |
| 7,598,887 B2 | 10/2009 | Sato et al. |

(Continued)

FOREIGN PATENT DOCUMENTS

| | | |
|---|---|---|
| CN | 2835947 Y | 11/2006 |
| DE | 10 2008 049 113 A1 | 5/2009 |

(Continued)

OTHER PUBLICATIONS

Japanese Office Action and English Language translation dated Aug. 20, 2013, (6 pgs.).

*Primary Examiner* — Steven Lim
*Assistant Examiner* — Hongmin Fan
(74) *Attorney, Agent, or Firm* — Foley & Lardner LLP (57) ABSTRACT

A parking assistance system for a vehicle includes multiple on-board cameras (11, 12, 13, 14) each configured to capture an image of a surrounding area of the vehicle, overhead image generating means (21) for joining the captured multiple images and generating an overhead image viewed from above the vehicle, and display means (22) for displaying the generated overhead image and a steering wheel turning frame corresponding to a steering wheel turning position at which steering wheel turning is performed on the way of reverse movement of the vehicle to a predetermined target parking position.

9 Claims, 5 Drawing Sheets

(56) References Cited

U.S. PATENT DOCUMENTS

| | | |
|---|---|---|
| 7,825,828 B2 | 11/2010 | Watanabe et al. |
| 2001/0026317 A1 | 10/2001 | Kakinami et al. |
| 2001/0030688 A1 | 10/2001 | Asahi et al. |
| 2002/0005779 A1* | 1/2002 | Ishii et al. ............... 340/436 |
| 2002/0041239 A1 | 4/2002 | Shimizu et al. |
| 2005/0163343 A1* | 7/2005 | Kakinami et al. ........... 382/103 |
| 2006/0061464 A1 | 3/2006 | Okada et al. |
| 2006/0287825 A1* | 12/2006 | Shimizu et al. ............. 701/216 |
| 2007/0273554 A1* | 11/2007 | Sakakibara ............... 340/932.2 |
| 2007/0299572 A1 | 12/2007 | Okamoto et al. |
| 2007/0299584 A1 | 12/2007 | Okamoto et al. |
| 2008/0033606 A1 | 2/2008 | Okamoto et al. |
| 2008/0316056 A1* | 12/2008 | Ghatak ................... 340/932.2 |
| 2010/0019934 A1 | 1/2010 | Takano |
| 2010/0089677 A1 | 4/2010 | Tanaka et al. |
| 2010/0274474 A1 | 10/2010 | Takano |

FOREIGN PATENT DOCUMENTS

| | | |
|---|---|---|
| EP | 1 065 642 A2 | 1/2001 |
| EP | 1 160 146 A2 | 12/2001 |
| EP | 1 862 375 A2 | 12/2007 |
| JP | 11-157404 A | 6/1999 |
| JP | 2000-229547 A | 8/2000 |
| JP | 2000-272445 A | 10/2000 |
| JP | 2001-106115 A | 4/2001 |
| JP | 2002-36991 A | 2/2002 |
| JP | 2003-112590 A | 4/2003 |
| JP | 2004-98981 A | 4/2004 |
| JP | 2004-114879 A | 4/2004 |
| JP | 2006-142982 A | 6/2006 |
| JP | 2006-160147 A | 6/2006 |
| JP | 2006-298208 A | 11/2006 |
| JP | 2006-298256 A | 11/2006 |
| JP | 2006-306224 A | 11/2006 |
| JP | 2006-526538 A | 11/2006 |
| JP | 2007-118804 A | 5/2007 |
| JP | 2007-118878 A | 5/2007 |
| JP | 2007-137171 A | 6/2007 |
| JP | 2007-176324 A | 7/2007 |
| JP | 2007-230371 A | 9/2007 |
| JP | 2008-7090 A | 1/2008 |
| JP | 2008-44529 A | 2/2008 |
| JP | 2008-055958 A | 3/2008 |
| JP | 2008-114776 A | 5/2008 |

* cited by examiner

PARKING ASSISTANCE SYSTEM AND PARKING ASSISTANCE METHOD

TECHNICAL FIELD

The present invention relates to a parking assistance system and a parking assistance method which present a driver with information serving as operation assistance for the driver to park a vehicle in a predetermined target parking position.

BACKGROUND ART

Parking assistance systems have been developed which present a driver with information serving as operation assistance for the driver to park his/her own vehicle in a predetermined parking region. Japanese Patent Application Publication No. 2004-114879 discloses a parking assist system capable of guiding a vehicle to a target parking position appropriately in the following manner. Specifically, the parking assist system joins images, captured with camera devices attached to the sides and the back of a vehicle, into an overhead image while changing the viewpoints of the images. The overhead image obtained here looks as if it is captured with a camera device attached right above the vehicle. The parking assist system displays the overhead image on which following positions and lines for parking are clearly shown: a reverse movement start position; a target parking position; a halfway parking position to turn opposite in mid-course; steering association lines which are lines associated with steering operation; and path indicating lines ideal for leading the vehicle to the target parking position (hereinafter referred to as ideal path indicating lines).

SUMMARY OF INVENTION

Technical Problem

Incidentally, in the above-described technique, all of the reverse movement start position, the target parking position, the halfway parking position, the steering association lines, and the ideal path indicating lines are displayed oh the overhead image. This causes a problem that a driver gets confused because it is difficult for the driver to grasp which lines the driver is supposed to follow for performing a parking operation.

The present invention has been proposed in view of the above-described circumstances and an object thereof is to provide a parking assistance system and a parking assistance method which are capable of offering easily viewable screen display while retaining an image of an entire parking path and thus allow a driver to easily grasp actions to be taken in the steering operation. Another object of the present invention is to provide a parking assistance system and a parking assistance method which are capable of allowing a driver to perform reverse movement to a halfway parking position easily.

Solution to Problem

In an aspect of the present invention, an overhead image is generated by changing viewpoints of images captured with multiple image capturing means for capturing an image around the vehicle to which the image capturing means are attached, into an image captured from right above the vehicle. Then, among parking trajectories for guiding the vehicle to a target parking position, predetermined display means is caused to display a target stop position to which the vehicle is supposed to move next and a parking trajectory line leading to the stop position are displayed in each parking step on the generated overhead image.

Meanwhile, in another aspect of the present invention, a surrounding area of a vehicle is captured with multiple on-board cameras which are attached to the vehicle and multiple images thus captured are joined to generate an overhead image viewed from above the vehicle, and display means displays the overhead image thus generated as well as an a steering wheel turning frame corresponding to a steering wheel turning position at which steering wheel turning is performed on the way of reverse movement of the vehicle to a predetermined target parking position.

BRIEF DESCRIPTION OF DRAWINGS

[FIG. 1]

[FIG. 2]

[FIG. 3]

[FIG. 4]

[FIG. 5]

[FIG. 6]

[FIG. 7]

[FIG. 8]

[FIG. 9]

DESCRIPTION OF EMBODIMENTS

Figure 1:
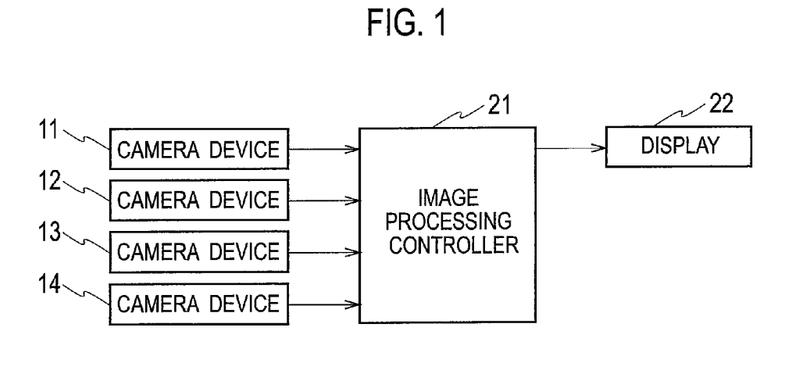
FIG. 1 is a block diagram showing a configuration of a parking assistance system according to an embodiment of the present invention.

A parking assistance system of a preferred embodiment of the present invention will be concretely described below.
[Configuration of Parking Assistance System]
As shown in FIG. 1, a parking assistance system shown as an embodiment of the present invention includes: multiple on-board camera devices 11, 12, 13, and 14 configured to capture images around the vehicle; an image processing controller 21 configured to process the images around the vehicle captured with these camera devices 11, 12, 13, and 14; and a display 22 configured to display images processed by this image processing controller 21.

Figure 2:
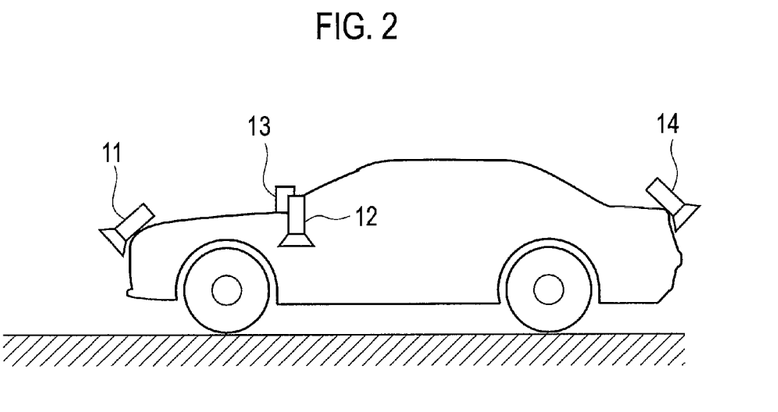
FIG. 2 is a view showing an example of attaching camera devices in the parking assistance system according to the embodiment of the present invention, to a vehicle.

The camera devices 11, 12, 13, and 14 are formed of devices, as imaging devices, such as CCD (charge coupled devices) that are small and capable of capturing high quality images, for example. The multiple camera devices 11, 12, 13, and 14 are provided to the vehicle so as to be able to capture the entire 360-degree range around the vehicle. Specifically, as shown in FIG. 2, for example, the camera devices 11, 12, 13, and 14 are respectively provided in four positions, namely, in front of the vehicle, on right and left sides of the vehicle, and at the back of the vehicle so as to capture scenes in front of, on right and left sides of, and at the back of the vehicle. Note that the multiple camera devices 11, 12, 13, and 14 are practically each formed into a very small shape and are disposed inside the vehicle or embedded in a vehicle body so as not to protrude from an outline of the vehicle body of the vehicle. The images captured with these camera devices 11, 12, 13, and 14 are supplied to the image processing controller 21 as electric signals. Meanwhile, the parking assistance system maybe provided with four or more camera devices as long as the camera devices allow the capturing of the entire 360-degree range around the vehicle.

By using information on images captured with the multiple camera devices 11, 12, 13, and 14, and by changing viewpoints of these images, the image processing controller 12 generates an overhead image which seems as if captured with a virtual camera device attached immediately above the vehicle. The image processing controller 21 configured to implement the above-described function may be formed by loading a DSP (digital signal processor) functioning as a core of the image processing, by being designed as an ASIC (applicant specific integrated circuit) which is an integrated circuit for specific application, or by a FPGA (field programmable gate array). Here, since the camera devices 11, 12, 13, and 14 cannot capture the vehicle to which they are attached, the image processing controller 21 depicts the vehicle by drawing CG (computer graphics), a photograph, or the like in a superimposed manner on the generated overhead image. Meanwhile, the image processing controller 21 can also generate another overhead image by partially enlarging the generated overhead image. Further, when parking the vehicle in a predetermined target parking position, the image processing controller 21 calculates a parking trajectory for guiding the vehicle to the target parking position. Then the image processing controller 21 draws following positions, lines, and the like for parking in a superposed manner on the generated overhead image: a reverse movement start position; the target parking position; a halfway parking position (hereinafter also referred to as a steering wheel turning position) to turn a steering wheel (turning opposite) on the way of reverse movement to the target parking position; steering association lines which are lines associated with steering operation; and path indicating lines ideal for leading the vehicle to the target parking position (hereinafter referred to as ideal path indicating lines.) The above-described image processing controller 21 displays the generated image on the display 22.

Figure 3:
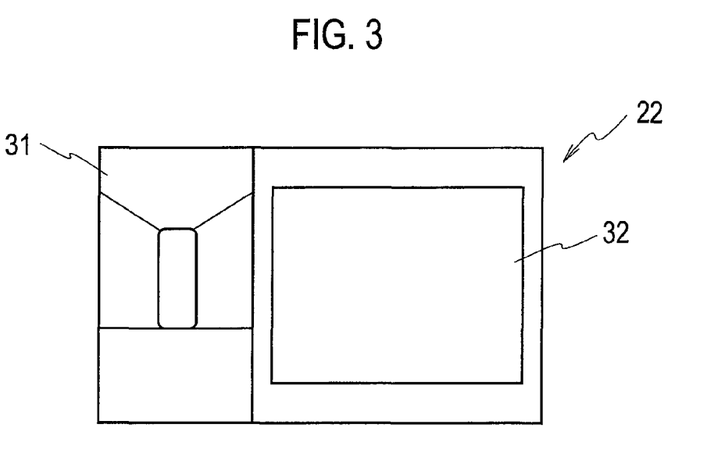
FIG. 3 is a view showing a display example of a display in the parking assistance system according to the embodiment of the present invention.

The display 22 is formed of an on-board liquid crystal display or the like mounted to the vehicle in the vicinity of a dashboard thereof, for example. Note that this display 22 may also serve as a display used for displaying map information and the like when performing navigation of the vehicle. The display 22 displays images including the overhead image supplied from the image processing controller 21 on a display screen, thereby presenting a driver with information to assist the driver to park the vehicle in the target parking position. Here, as the on-board display 22, displays generally have a horizontally long display screen whereas the overhead image generated by the image processing controller 21 is often formed into a vertically long image so as to depict the vehicle that travels in a front-rear direction. For this reason, as shown in FIG. 3, for example, a display region of the display 22 is broadly divided into an overhead image display region 31 for displaying the overhead image and a non-overhead image display region 32 other than this overhead image display region 31. Here, the non-overhead image display region 32 displays an image captured with the camera device 11 located in front of the vehicle, an image captured with the camera device 14 located at the back of the vehicle, and the like. In this way, the display 22 can display images which the driver can easily view and needs for parking. In this respect, consider a configuration where the image captured with the camera device 11 located in front of the vehicle is displayed when the vehicle travels forward while the image is switched to display the image captured with the camera device 14 located at the back of the vehicle when the vehicle travels backward. In this configuration, the images taken by these camera devices 11 and 14 are often indiscernible since the camera devices 11 and 14 are mounted at similar mounting heights and at similar mounting angles relative to the vehicle. Accordingly, information as to which of the camera devices 11 and 14 has captured the displayed image may be displayed on the display 22.

(Operation of Parking Assistance System)

The parking assistance system having the respective constituents described above draws a reverse movement start position, the target parking position, a halfway parking position, a steering association line, an ideal path indicating line, and the like in the superimposed manner on the generated overhead image and thereby presents the driver with the information to assist the driver to park the vehicle in the target parking position. Hereinbelow, processing of the parking assistance system will be described by using a case of performing parallel parking as an example.

Figure 4:
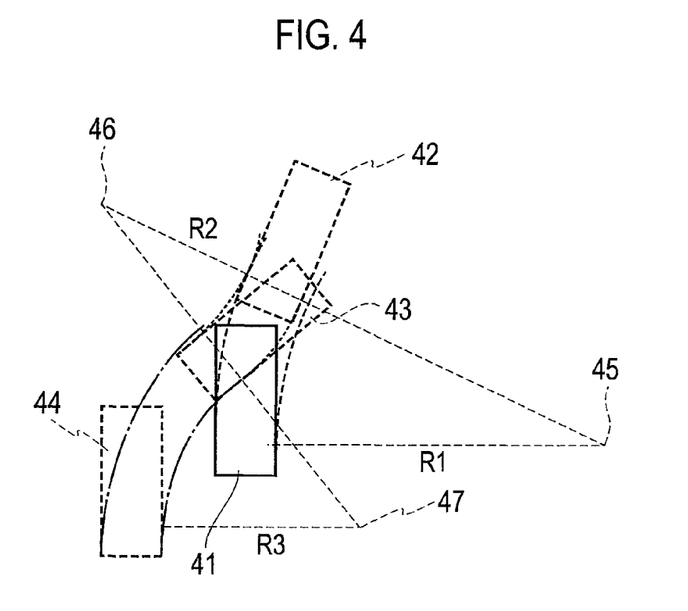
FIG. 4 is a view showing an example of parking trajectories to be calculated by the parking assistance system according to the embodiment of the present invention in the case of performing parallel parking to a target parking position located on a left side of the vehicle.

As shown in FIG. 4, consider a case of stopping a vehicle in a parking start position 41 and performing parallel parking to a target parking position 44 located on the left side of the vehicle. For performing this parallel parking, as a first step, the vehicle is moved to a reverse movement start position 42 by turning the steering wheel by a certain amount so that the vehicle moves around a first turning center 45 which is in a position on the right side of the vehicle located in the parking start position 41 and at a distance of a radius R1 away from the vehicle. Subsequently, after moving the vehicle to the reverse movement start position 42, as a second step, the vehicle is moved to a halfway parking position 43 by turning the steering wheel by a certain amount in such a way that the vehicle moves around a second turning center 46 which is in a position on the left side of the vehicle located in the reverse movement start position 42 and at a distance of a radius R2 away from the first turning center 45. Lastly, as a third step, the vehicle is moved to the target parking position 44 by turning the steering wheel by a certain amount in such a way that the vehicle moves around a third turning center 47 which is in a position on the right side of the vehicle located in the halfway parking position 43 and at a distance of a radius R3 away from a left edge of the target parking position 44. In this way, the vehicle can complete the parallel parking.

Here, consider a case where an entire parking path, including the steering association line and the ideal path indicating line, from the parking start position 41 to the target parking position 44, as well as frame lines indicating the reverse movement start position 42, the halfway parking position 43, and the target parking position 44 are displayed on the overhead image. In this case, it is certainly possible to grasp the entire path necessary for parking. However, the numerous lines displayed cause a problem of considerably confusing a driver particularly when the driver is not good at parking.

Accordingly, in the parking assistance system, as to each of parking positions, a target stop position to which the vehicle is supposed to move next and a targeted steering angle to reach the target stop position are displayed on the overhead image. In this manner, the parking assistance is simplified and the information which allows the driver to comprehend the path easily is presented.

[Display Contents in First Step]

Now, a description will be given below of lines displayed on the display 22 when the vehicle located in the parking start position 41 is moved forward to the reverse movement start position 42 in the above-described step 1.

Figure 5:
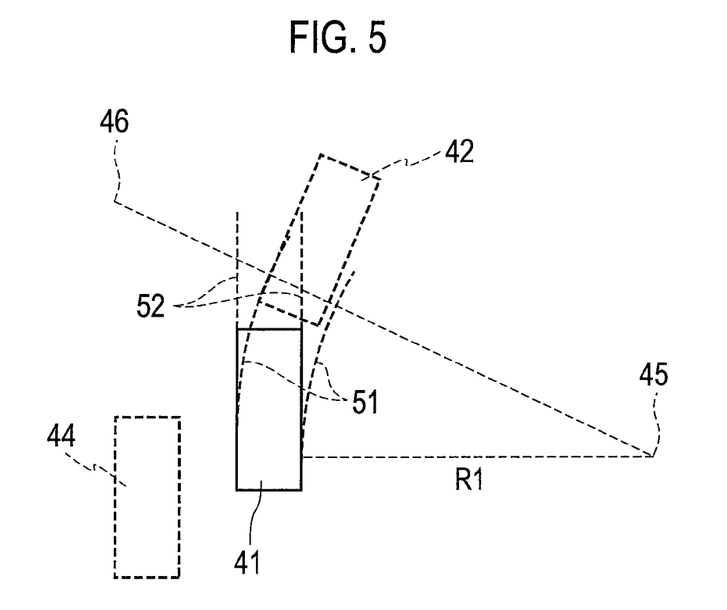
FIG. 5 is a view showing a display example to be displayed on the display when the vehicle located in a parking start position is to be moved forward to a reverse movement start position.

Here, the image processing controller 21 calculates the parking trajectory for guiding the vehicle to the target parking position 44. Then, as shown in FIG. 5, for example, the image processing controller 21 generates information on a frame line of the reverse movement start position 42 which is the target stop position to which the vehicle is supposed to move next, information on ideal path indicating lines 51 to lead the vehicle to the reverse movement start position 42, and information on steering association lines 52 associated with a steering angle of the vehicle and thus displays these lines on the overhead image. Here, FIG. 5 shows an aspect in which the steering wheel is in a neutral state and the steering association lines 52 extend linearly forward from the vehicle. Note that these linear steering association lines 52 change in accordance with the operation on the steering wheel. Specifically, the image processing controller 21 calculates the steering association lines 52 on the basis of the operation on the steering wheel. From a state as shown in FIG. 5, when the driver turns the steering wheel rightward to move the vehicle forward while fixing the steering wheel while keeping the steering association lines 52 overlapped on the ideal path indicating lines 51, the vehicle can move properly to the reverse movement start position 42.

In the case of the first step, the parking assistance system which displays the above-described information on the display 22 allows the driver to clearly grasp the parking assistance information such as how much the steering wheel should be turned or at which position the reverse movement start position 42 is to be.

The target parking position 44 is the frame line necessary for allowing the driver to imagine the entire parking path. However, if the frame line is displayed all the time simultaneously with other lines, the driver may misunderstand the frame line as the target stop position to which the vehicle is supposed to move next. Therefore, the parking assistance system may be configured to switch the display under control of the image processing controller 21, in a way that the frame line of the target parking position 44 is displayed on the display 22 while the vehicle is stopped whereas the frame line of the target parking position 44 is not displayed on the display 22 while the vehicle is moving, for example.

Figure 6:
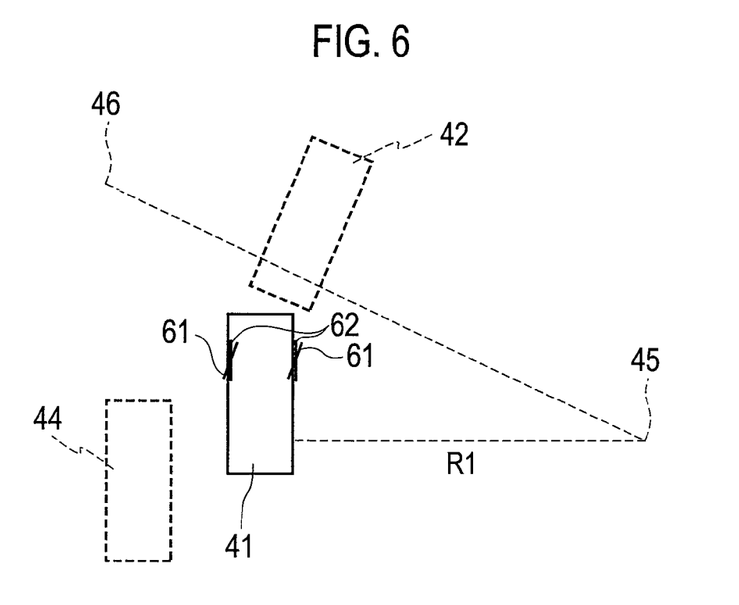
FIG. 6 is a view showing another display example to be displayed on the display when the vehicle located in the parking start position is to be moved forward to a reverse movement start position.

Meanwhile, instead of the displaying of the ideal path indicating lines 51 and the steering association lines 52 associated with the steering operation as shown in FIG. 5, the image processing controller 21 may generate information on ideal tire turning angle lines 61 showing an ideal tire turning angle to lead the vehicle to the reverse movement start position 42 and information on tire turning angle association lines 62 showing a tire turning angle associated with the steering operation so as to display these lines on the overhead image as shown in FIG. 6. In this way, the parking assistance system can make the lengths of the displayed lines smaller than the case shown in FIG. 5, thereby simply presenting the driver with the necessary information.

Further, FIG. 5 illustrates the aspect of how the trajectories of rear wheels of the vehicle change. Instead, the image processing controller 21 may depict the turning angle of the steering wheel by displaying a trajectory of an angle of a front end of the vehicle or an icon such as an arrow.

Specifically, the parking assistance system only has to display appropriate information on the display 22 as long as the information allows the driver to grasp the information contents such as how much the steering wheel should be operated to lead the vehicle to the reverse movement start position 42 or how much the steering wheel is currently operated, and as long as the information has contents to allow the driver to grasp that the vehicle is to supposed to move forward.

[Display Contents in Second Step]

Now, a description will be given below of lines displayed on the display 22 when the vehicle located in the reverse movement start position 42 is moved backward to the halfway parking position 43 in the above-described step 2.

Figure 7:
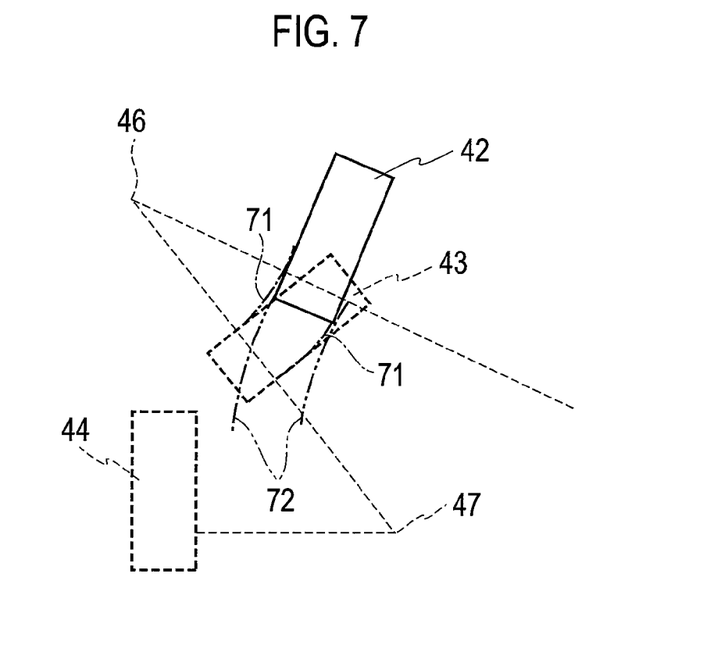
FIG. 7 is a view showing a display example to be displayed on the display when the vehicle located in the reverse movement start position is to be moved backward to a halfway parking position.

Here, as shown in FIG. 7, for example, the image processing controller 21 generates information on a frame line of the halfway parking position 43 which is the target stop position to which the vehicle is supposed to move next (the frame line is also called a steering wheel turning frame corresponding to the steering wheel turning position), information on ideal path indicating lines 51 to lead the vehicle to the halfway parking position 43, and information on steering association lines 52 associated with a steering angle of the vehicle and thus displays these lines on the overhead image. Here, the image processing controller 21 generates the information so as to display the ideal path indicating lines 71 and the steering association lines 72 on the overhead image by use of marks different from the marks depicting the ideal path indicating lines 51 and the steering association lines 52 as shown in FIG. 5 which are displayed during the forward movement of the vehicle. Note that FIG. 7 shows an aspect where the steering association lines 72 are displayed so as to form arcs in the right direction because the vehicle is stopped in the reverse movement start position 42 and the steering wheel is turned in the right direction in a certain amount. However, these steering association lines 72 in the arc shapes also vary with the steering operation. Specifically, the image processing controller 21 calculates the steering association lines 72 on the basis of the operation on the steering wheel. From a state as shown in FIG. 7, when the driver turns the steering wheel leftward in such a way as to overlap the steering association lines 72 on the ideal path indicating lines 71, fixes the steering wheel, and moves the vehicle backward while keeping the steering association lines 72 overlapped on the ideal path indicating lines 71, the vehicle can move properly to the halfway parking position 43.

In the parking assistance system, the display 22 displays the frame line of the target stop position to which the vehicle is supposed to move next, the steering association lines, and the ideal path indicating lines by using the predetermined marks during the forward movement of the vehicle. Meanwhile, in the second step, during the reverse movement of the vehicle, the display 22 displays the frame line of the target stop position to which the vehicle is supposed to move next, the steering association lines, and the ideal path indicating lines by using the marks different from those used during the forward movement of the vehicle. In this manner, the parking assistance system achieves the simple screen display. Moreover, the parking assistance system is also capable of presenting the information with which the driver can easily imagine the parking path leading the vehicle to the halfway parking position 43. Further, the parking assistance system allows the driver to clearly grasp the information to assist parking such as distinction between the forward movement and the reverse movement or how much the steering wheel is operated.

Meanwhile, instead of the displaying of the ideal path indicating lines 71 and the steering association lines 72 associated with the steering operation as shown in FIG. 7, the image processing controller 21 may generate information on ideal tire turning angle lines and information on tire turning angle association lines such as the ones as shown in FIG. 6 as above so as to display these lines on the overhead image, although the ideal tire turning angle lines and the tire turning angle association lines are not particularly illustrated.

Further, FIG. 7 illustrates the aspect of how the trajectories of rear wheels of the vehicle change. Instead, the image processing controller 21 may depict the turning angle of the steering wheel by displaying a trajectory of an angle of a rear end of the vehicle or an icon such as an arrow.

[Display Contents in Third Step]

Lastly, a description will be given below of lines displayed on the display 22 when the vehicle located in the halfway parking position 43 is moved backward to the target parking position 44 in the above-described step 3.

Figure 8:
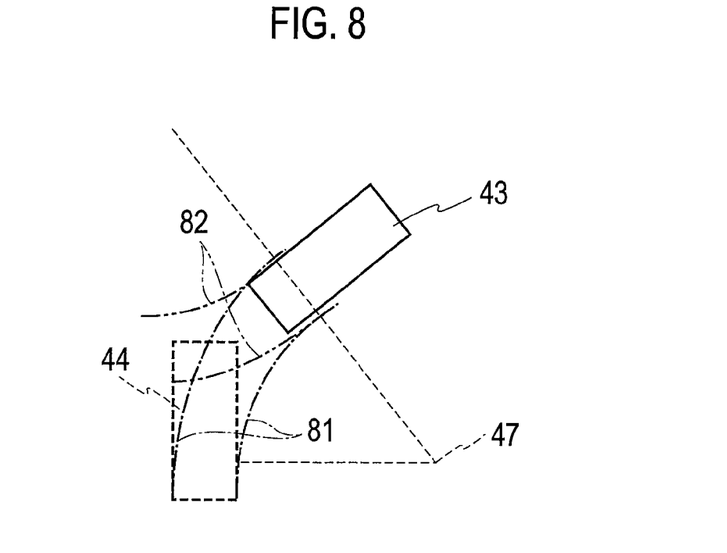
FIG. 8 is a view showing a display example to be displayed on the display when the vehicle located in the halfway parking position is to be moved backward to the target parking position.

Here, the image processing controller 21 generates the information so as to achieve the display contents which are substantially similar to the display contents described by using FIG. 7. Specifically, as shown in FIG. 8, for example, the image processing controller 21 generates information on a frame line of the target parking position 44 which is the target stop position to which the vehicle is supposed to move next, information on ideal path indicating lines 81 to lead the vehicle to the target parking position 44, and information on steering association lines 82 associated with a steering angle of the vehicle and thus displays these lines on the overhead image. Here, the image processing controller 21 generates the information so as to display the ideal path indicating lines 81 and the steering association lines 82 on the overhead image while using marks different from the marks depicting the ideal path indicating lines 51 and the steering association lines 52 as shown above in FIG. 5 which are displayed during the forward movement of the vehicle. Note that FIG. 8 shows an aspect where the steering association lines 82 are displayed so as to form arcs in the left direction because the vehicle is stopped in the halfway parking position 43 and the steering wheel is turned in the left direction in a certain amount. However, these steering association lines 82 in the arc shapes also vary with the steering operation. Specifically, the image processing controller 21 calculates the steering association lines 82 on the basis of the operation on the steering wheel.

Figure 9:
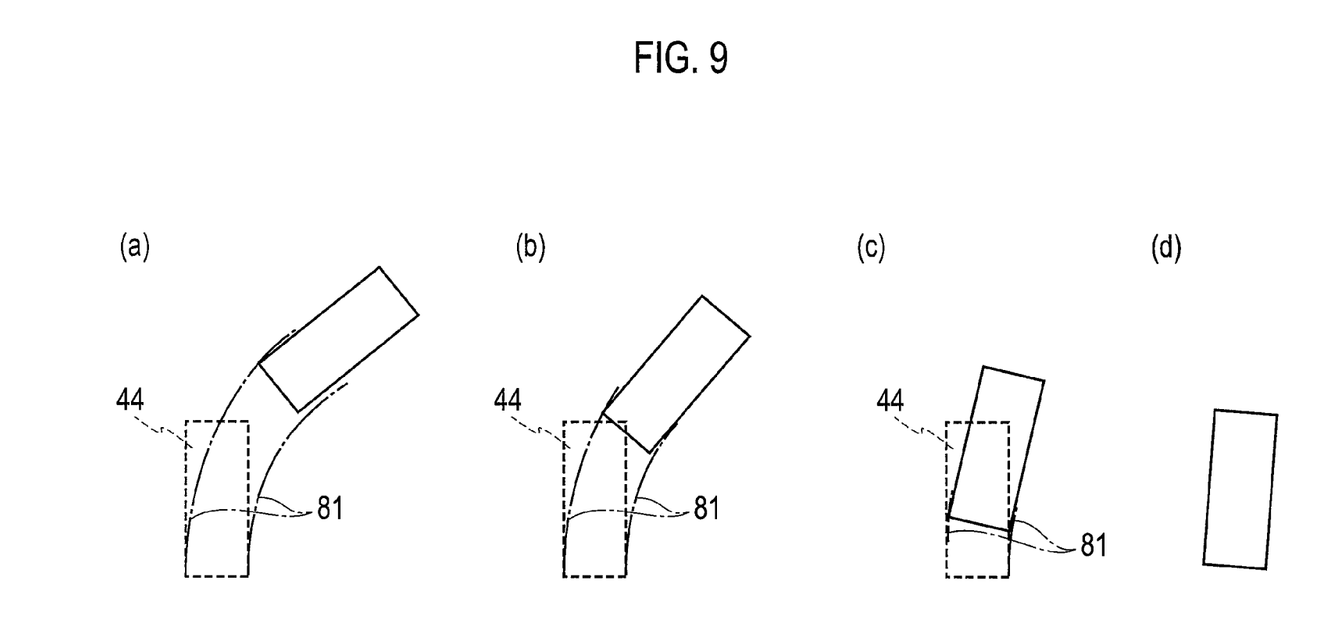
FIG. 9 is a view showing aspects of an ideal path indicating line which changes with movement of the vehicle in the state shown in FIG. 8.

From a state as shown in FIG. 8, when the driver turns the steering wheel rightward in such a way as to overlap the steering association lines 82 on the ideal path indicating lines 81 as shown in FIG. 9(*a*), fixes the steering, and moves the vehicle backward wheel while keeping the steering association lines 82 overlapped on the ideal path indicating lines 81 as shown in FIG. 9(*b*), the vehicle starts moving to the target parking position 44 as shown in FIG. 9(*c*). Finally, the vehicle reaches the target parking position 44 as shown in FIG. 9(*d*).

Here, as shown in FIG. 9(*d*), the image processing controller 21 deletes the target parking position 44 when the mark indicating the actual position of the vehicle substantially overlaps target parking position 44. The target parking position 44 is deleted as described above because of the small requirement of displaying the target parking position 44 since it is likely that another vehicle is stopped in front of or behind the target parking position 44 or that white lines may be actually drawn on the ground.

In the parking assistance system, in the third step, the display 22 displays the information as described above. In this manner, the parking assistance system achieves the simple screen display. Moreover, the parking assistance system is also capable of presenting the information with which the driver can easily imagine the parking path leading the vehicle to the target parking position 44. Further, the parking assistance system allows the driver to clearly grasp the information to assist parking such as distinction between the forward movement and the reverse movement or how much the steering wheel is operated.

Meanwhile, instead of the displaying of the ideal path indicating lines 81 and the steering association lines 82 associated with the steering operation as shown in FIG. 8 as above, the image processing controller 21 may generate information on ideal tire turning angle lines and information on tire turning angle association lines such as the ones as shown in FIG. 6 as above so as to display these lines on the overhead image, although the ideal tire turning angle lines and the tire turning angle association lines are not particularly illustrated.

Further, FIG. 8 and FIG. 9 illustrate the aspect of how the trajectories of rear wheels of the vehicle change. Instead, the image processing controller 21 may depict the turning angle of the steering wheel by displaying a trajectory of an angle of a rear end of the vehicle or an icon such as an arrow.

As described above, according to the parking assistance system, the target stop position to which the vehicle is supposed to move next, the corresponding steering association lines, and the corresponding ideal path indicating lines are displayed in each parking step on the overhead image. Therefore, the parking assistance system allows the driver to easily grasp which lines the driver is supposed to follow when operating the steering wheel and moving the vehicle. For this reason, the parking assistance system can provide the easily viewable screen display while retaining the image of the entire parking path. Moreover, the parking assistance system allows the driver to clearly and easily grasp distinction between the forward movement and the reverse movement as well as how much the steering wheel is operated. In particular, the parking assistance system does not display all the lines on the display 22 at the same time. For this reason, the parking assistance system can prevent degradation in visibility attributable to considerable distortion of vision of an obstacle on the display 22 and to excessive size reduction of the parking trajectories such as the ideal path indicating lines or the steering association lines, the frame lines of the parking positions, and so forth.

Moreover, the parking assistance system is configured to display the marks indicating the ideal path indicating lines and the steering association lines to be displayed on the overhead image in a way that the marks for forward movement of the vehicle are different from the marks for the reverse movement of the vehicle under control of the image processing controller 21. Accordingly, even when the overhead image displayed on the overhead image display region 31 is a fixed image and the image displayed on the non-overhead image display region 32 is hardly distinguishable as to whether the image is captured with the camera device 11 located in front of the vehicle or captured with the camera device 14 located at the back of the vehicle, the driver can determine instantaneously as to whether the vehicle is currently moving forward or backward.

Although the foregoing embodiment has described the case of performing parallel parking to the target parking position 44 located on the left side of the vehicle, the parking assistance system is applicable likewise to a case of performing parallel parking to a target parking position located on the right side of the vehicle. Moreover, the parking assistance system is applicable likewise to a case of performing double parking to a target parking position located either on the left side or the right side of the vehicle.

Moreover, in order for parking facilitation, the parking assistance system is preferably configured to display on the display 22 the frame lines of the reverse movement start position 42 and the halfway parking position 43 with the frame lines having a width larger than the vehicle width of the vehicle under the control of the image processing controller 21, the reverse movement start position 42 and the halfway parking position 43 displayed on the overhead image. In addition, the parking assistance system is preferably configured to display the target parking position 44 on the display 22 with the frame line having the same width as that of the vehicle width of the vehicle under the control of the image processing controller 21. The reason why the reverse movement start position 42 and the halfway parking position 43 are displayed on the display 22 by use of the frame lines having larger width than the vehicle width of the vehicle is because it is easily understandable for the driver to stop the vehicle within the frame lines than stopping the vehicle so as to match exactly with the frame line having the same width as the vehicle width of the vehicle when the driver moves the vehicle to the reverse movement start position 42 or the halfway parking position 43 which is the target to which the vehicle is supposed to move next. In the meantime, the reason why the target parking position 44 is displayed on the display 22 by use of the frame line having the same width as the vehicle width of the vehicle is because the target parking position 44 is used also for setting up the parking position and it is hard for the driver to recognize the target parking position 44 if the frame line does not have the same width with the vehicle width of the vehicle. In addition, the reason why the above-described display is made when the vehicle is to be moved to the reverse movement start position 42 and the halfway parking position 43 is because it is not possible to move the vehicle by using as targets the frame lines actually drawn on the ground or other vehicles located around the vehicle itself, and it is therefore necessary to keep displaying the frame lines indicating the reverse movement start position 42 and the halfway parking position 43 until the vehicle moves to those positions. On the other hand, the reason why the above-described display is made when the vehicle is to be moved to the target parking position 44 is because, it is possible to move the vehicle by using as targets the frame lines actually drawn on the ground or other vehicles located around the vehicle itself, and it is therefore easier for the driver to carry out parking by clarifying positional relationship with surrounding objects when the vehicle comes close to the position. Hence the display of the frame line indicating the target parking position 44 may be deleted.

Further, the parking assistance system may be configured to change the display contents in accordance with a shift signal and a vehicle speed V of the vehicle. To be more precise, in a case where the shift signal represents other than reverse (backward) and the vehicle speed V satisfies V>0, the image processing controller 21 causes the display 22 to display the frame line of the target stop position to which the vehicle is supposed to move next as well as the parking trajectory line including the steering association lines and the tire turning angle association lines associated with the steering operation. Here, in a case where the vehicle speed V satisfies V=0, the image processing controller 21 causes the display 22 to display the frame line of the target parking position in addition to the above-described information. On the other hand, in a case where the shift signal represents the reverse and the vehicle speed V satisfies V>0, the image processing controller 21 causes the display 22 to display the frame line of the target stop position to which the vehicle is supposed to move next as well as the parking trajectory lines including the steering association lines and the tire turning angle association lines associated with the steering operation. Here, in a case where the vehicle speed V satisfies V=0, the image processing controller 21 causes the display 22 to display the frame line of the target parking position and trajectory lines of steering instructions such as the ideal path indicating lines or the ideal tire turning angle lines in addition to the above-described information. In this manner, the parking assistance system allows the driver to easily grasp as to which stage in the parking path the vehicle is currently located by displaying the frame line of the target parking position 44 on the display 22 in the case where the vehicle speed V satisfies V=0. Meanwhile, in a case where the vehicle starts moving after the vehicle speed V transits from V=0 to V>0, the image processing controller 21 is preferably configured to display the frame line of the target parking position 44 on the display 22 only for a predetermined period of time and then to delete the frame line. In this way, the parking assistance system can prevent confusion of the driver attributable to disappearance of the frame line of the target parking position 44 from the display 22 immediately after the driver starts moving the vehicle.

Furthermore, the parking assistance system may also be configured to cause the display 22 to display the steering association lines, under control of the image processing controller 21, such that the lengths of the lines become smaller as the vehicle comes closer to the target stop position to which the vehicle is supposed to move next. In this way, the parking assistance system can measure a distance to the target stop position to which the vehicle is supposed to move next and prevent cumbersome impression from being given to the driver with simplified display of the steering trajectory lines displayed thereon.

Meanwhile, the parking assistance system is preferably configured to notify the driver of the fact that the vehicle is coming close to the target stop position to which the vehicle is supposed to move next or to the target parking position 44 by means other than sounds and images, under control of the image processing controller 21. In this way, the parking assistance system allows the driver to recognize as to which stage in the parking path the vehicle is currently located even when the driver is visually checking surrounding conditions.

As described above in detail, according to the parking assistance system shown as the embodiment of the present invention, the overhead image is generated by changing viewpoints of the images captured with the multiple camera devices 11, 12, 13, and 14 into the image captured from immediately above the vehicle under control of the image processing controller 21. Then, among the parking trajectories for guiding the vehicle to the target parking position 44, the display 22 displays the target stop position to which the vehicle is supposed to move next and the parking trajectory line leading to the stop position on the generated overhead image in each parking step. In this way, the parking assistance system is capable of providing the easily viewable screen display while retaining the image of the entire parking path and of thus allowing the driver to easily grasp an action to be taken in steering operation. Moreover, according to the parking assistance system shown as the embodiment of the present invention, the surrounding area of the vehicle is captured with the multiple on-board cameras 11, 12, 13, and 14 and the multiple images thus captured are joined to generate the overhead image viewed from above the vehicle, and the display 22 displays the overhead image thus generated and the steering wheel turning frame corresponding to the steering wheel turning position to perform steering wheel turning on the way of reverse movement of the vehicle to the target parking position 44. Hence the driver can carry out the reverse movement to the halfway parking position easily.

Meanwhile, this parking assistance system is configured to cause the display 22 to display the steering association lines being the lines associated with the steering operation, and the ideal path indicating lines being the path indicating lines ideal for leading the vehicle to the target stop position to which the vehicle is supposed to move next as the parking trajectory lines under control of the image processing controller 21. Accordingly, the driver can easily grasp which lines the driver is supposed to follow when operating the steering wheel and moving the vehicle.

Further, this parking assistance system is configured to cause the display 22 to display the tire turning angle association lines showing the tire turning angle associated with the steering operation and the ideal tire turning angle lines showing the ideal tire turning angle to lead the vehicle to the target stop position to which the vehicle is supposed to move next as the parking trajectory lines, under control of the image processing controller 21. Accordingly, the display 22 can display the lines having shorter lengths, thereby simply presenting the driver with the necessary information. In addition, the driver can clearly grasp the target stop position to which the vehicle is supposed to move next and an amount of the steering operation, thereby performing the parking easily.

Furthermore, in a case where the shift signal of the vehicle represents other than the reverse and the vehicle speed V satisfies V>0, this parking assistance systems causes the display 22 to display the target stop position to which the vehicle is supposed to move next as well as the parking trajectory lines associated with the steering operation under control of the image processing controller 21. Here, in a case where the vehicle speed V satisfies V=0, the parking assistance system causes the display 22 to display the target stop position to which the vehicle is supposed to move next, the parking trajectory lines associated with the steering operation, and the target parking position 44. On the other hand, in a case where the shift signal of the vehicle represents the reverse and the vehicle speed V satisfies V>0, this parking assistance systems causes the display 22 to display the target stop position to which the vehicle is supposed to move next as well as the parking trajectory lines associated with the steering operation, under control of the image processing controller 21. Here, in a case where the vehicle speed V satisfies V=0, the parking assistance system causes the display 22 to display the target stop position to which the vehicle is supposed to move next, the parking trajectory lines of the steering instructions, and the target parking position 44. In this way, by causing the display 2 to display the frame line of the target parking position 44 when the vehicle speed V satisfies V=0, this parking assistance system allows the driver to easily grasp as to which stage in the parking path the vehicle is currently located.

Meanwhile, when the vehicle starts moving after the vehicle speed V transits from V=0 to V>0, this parking assistance system causes the display 22 to display the target parking position 44 only for the predetermined period of time and then deletes the target parking position 44 under control of the image processing controller 21. Hence the parking assistance system can prevent confusion of the driver attributable to disappearance of the frame line of the target parking position 44 from the display 22 immediately after the driver starts moving the vehicle.

Furthermore, this parking assistance system causes the display 22 to display the target stop position to which the vehicle is supposed to move next by using the larger width than the vehicle width of the vehicle and to cause the display 22 to display the target parking position 44 by using the same width as the vehicle width of the vehicle under control of the image processing controller 21. Hence the parking assistance system can provide the screen display which is extremely easily viewable for the driver.

Furthermore, when the target stop position to which the vehicle is supposed to move next is the target parking position 44, this parking assistance system deletes the target parking position 44 displayed on the display 22 as the vehicle comes closer to the target parking position 44 under control of the image processing controller 21. Accordingly, the parking assistance system allows the driver to clearly grasp the frame lines actually drawn on the ground and the positional relationship between the vehicle and other vehicles located around the vehicle itself, thereby facilitating the parking action.

Meanwhile, among the parking trajectory lines, this parking assistance system causes the display 22 to display the steering association lines associated with the steering operation under control of the image processing controller 21 such that the lengths of the lines become smaller as the vehicle comes closer to the target stop position to which the vehicle is supposed to move next. In this way, it is possible to measure the distance to the target stop position to which the vehicle is supposed to move next and to prevent cumbersome impression to be given to the driver with the simplified display of the steering trajectory line to be displayed thereon.

Further, this parking assistance system notifies the driver of the fact that the vehicle is coming close to the target stop position to which the vehicle is supposed to move next or to the target parking position 44 by means other than sounds and images, under control of the image processing controller 21. In this way, the parking assistance system allows the driver to determine as to which stage in the parking path the vehicle is currently located even when the driver is visually checking surrounding conditions.

Meanwhile, this parking assistance system causes the display 22 to display the marks depicting the parking trajectory lines so that the marks for moving forward are different from the marks for moving backward, under control of the image processing controller 21. Hence the parking assistance system allows the driver to clearly and easily grasp distinction between the forward movement and the reverse movement.

Note that the above-described embodiment merely represents a certain example of the present invention. For this reason, the present invention will not be limited only to the above-described embodiment. Needless to say, various modifications involving the design and the like are possible as embodiments other than this embodiment as long as such modifications do not exceed the technical scope of the present invention.

This application claims the benefit of priority based on Japanese Patent Application No. 2008-151473 applied on Jun. 10, 2008, the entire contents of which are incorporated in this specification of the invention by reference.

[Industrial Applicability]

According to the parking assistance system and the parking assistance method of the present invention, an overhead image is generated by changing viewpoints of images around a vehicle which are captured with multiple image capturing means into an image captured from immediately above the vehicle. Then, among parking trajectories for guiding the vehicle to a target parking position, a target stop position to which the vehicle is supposed to move next and a parking trajectory line leading the vehicle to the stop position are displayed in each parking step on the generated overhead image. In this way, the parking assistance system and the parking assistance method of the present invention are capable of providing easily viewable screen display to a driver while retaining an image of an entire parking path and thus allow the driver to grasp contents of suggested steering operation easily. In particular, a steering wheel turning frame corresponding to a steering wheel turning position to perform steering wheel turning on the way of reverse movement of the vehicle to the target parking position is displayed on the overhead image. Accordingly, the driver can carry out the reverse movement to the halfway parking position easily. Hence the parking assistance system and the parking assistance method of the present invention are industrially applicable.

The invention claimed is:

1. A parking assistance system for a vehicle comprising:
a plurality of on-board cameras each configured to capture an image of a surrounding area of the vehicle;
overhead image generating means for joining a plurality of images captured with the plurality of on-board cameras to thus generate an overhead image viewed from above the vehicle;
display means for displaying the generated overhead image, a vehicle mark indicating actual position of the vehicle, and a steering wheel turning frame corresponding to a steering wheel turning position on the way of reverse movement of the vehicle to a predetermined target parking position,
wherein the steering wheel turning position is a position where the vehicle approaches with a steering wheel turned in one of a right turn position and a left turn position, where the steering wheel is turned from the one of the right turn position and the left turn position to the other of the right turn position and the left turn position, and where the vehicle leaves with the steering wheel turned in the other of the right turn position and the left turn position, and
wherein the steering wheel turning frame has a shape corresponding to an outline of the vehicle and has a larger width than a vehicle width of the vehicle; and
image processing control means for causing the display means to display the steering wheel turning frame and a parking trajectory line leading to the steering wheel turning position on the generated overhead image,
wherein the image processing control means causes the display means to display, as the parking trajectory lines, a tire turning angle association line indicating a turning angle of a tire associated with steering operation and an ideal tire turning angle line indicating a tire turning angle ideal for leading to the steering wheel turning position to which the vehicle is supposed to move next.

2. A parking assistance system for a vehicle comprising:
a plurality of on-board cameras each configured to capture an image of a surrounding area of the vehicle;
overhead image generating means for joining a plurality of images captured with the plurality of on-board cameras to thus generate an overhead image viewed from above the vehicle;
display means for displaying the generated overhead image, a vehicle mark indicating actual position of the vehicle, and a steering wheel turning frame corresponding to a steering wheel turning position on the way of reverse movement of the vehicle to a predetermined target parking position,
wherein the steering wheel turning position is a position where the vehicle approaches with a steering wheel turned in one of a right turn position and a left turn position, where the steering wheel is turned from the one of the right turn position and the left turn position to the other of the right turn position and the left turn position, and where the vehicle leaves with the steering wheel turned in the other of the right turn position and the left turn position, and
wherein the steering wheel turning frame has a shape corresponding to an outline of the vehicle and has a larger width than a vehicle width of the vehicle; and
image processing control means for causing the display means to display the steering wheel turning frame and a parking trajectory line leading to the steering wheel turning position on the generated overhead image,
wherein in a case where a shift signal of the vehicle represents any indication other than reverse, the image processing control means causes the display means to display the steering wheel turning frame of the steering wheel turning position to which the vehicle is supposed to move next and a parking trajectory line associated with steering operation when a vehicle speed V is V>0, and to display the steering wheel turning frame of the steering wheel turning position to which the vehicle is supposed to move next, the parking trajectory line associated with steering operation, and a frame line of the target parking position when the vehicle speed V is V=0, and
in a case where the shift signal of the vehicle represents the reverse, the image processing control means causes the display means to display the steering wheel turning frame of the steering wheel turning position to which the vehicle is supposed to move next and the parking trajectory line associated with steering operation when the vehicle speed V is V>0, and to display the steering wheel turning frame of the steering wheel turning position to which the vehicle is supposed to move next, a parking trajectory line of a steering instruction, and the frame line of the target parking position when the vehicle speed V is V=0.

3. The parking assistance system according to claim 2, wherein the image processing control means causes the display means to display the frame line of the target parking position only for a predetermined time period and then deletes the target parking position when the vehicle starts moving with the vehicle speed V transiting from V=O to V>0.

4. A parking assistance system for a vehicle comprising:
a plurality of on-board cameras each configured to capture an image of a surrounding area of the vehicle;
overhead image generating means for joining a plurality of images captured with the plurality of on-board cameras to thus generate an overhead image viewed from above the vehicle;
display means for displaying the generated overhead image, a vehicle mark indicating actual position of the vehicle, and a steering wheel turning frame corresponding to a steering wheel turning position on the way of reverse movement of the vehicle to a predetermined target parking position,
wherein the steering wheel turning position is a position where the vehicle approaches with a steering wheel turned in one of a right turn position and a left turn position, where the steering wheel is turned from the one of the right turn position and the left turn position to the other of the right turn position and the left turn position, and where the vehicle leaves with the steering wheel turned in the other of the right turn position and the left turn position, and wherein the steering wheel turning frame has a shape corresponding to an outline of the vehicle and has a larger width than a vehicle width of the vehicle; and image processing control means for causing the display means to display the steering wheel turning frame and a parking trajectory line leading to the steering wheel turning position on the generated overhead image, wherein the image processing control means causes the display means to display a steering association line among the parking trajectory lines in a way that a length of the steering association line becomes smaller as the vehicle comes closer to the steering wheel turning position to which the vehicle is supposed to move next, the steering association line being a line associated with a steering operation.

5. A parking assistance system configured to present a driver with information to assist an operation to park a vehicle in a predetermined target parking position, the system comprising:

a plurality of image capturing means each for capturing an image of a surrounding area of the vehicle; and image processing control means for changing viewpoints of the images captured by the plurality of image capturing means to generate an overhead image which is an image captured from right above the vehicle and causing predetermined display means to display a vehicle mark indicating actual position of the vehicle, a frame line corresponding to a target stop position to which the vehicle is supposed to move next, and a parking trajectory line leading to the stop position on the generated overhead image for each parking step, among parking trajectories for guiding the vehicle to the target parking position, wherein the target stop position is a position where the vehicle approaches with a steering wheel turned in one of a right turn position and a left turn position, where the steering wheel is turned from the one of the right turn position and the left turn position to the other of the right turn position and the left turn position, and where the vehicle leaves with the steering wheel turned in the other of the right turn position and the left turn position, wherein the frame line corresponding to the target stop position has a shape corresponding to an outline of the vehicle and has a larger width than a vehicle width of the vehicle, and wherein the image processing control means causes the display means to display, as the parking trajectory lines, a tire turning angle association line indicating a turning angle of a tire associated with a steering operation and an ideal tire turning angle line indicating a tire turning angle ideal for leading to the target stop position to which the vehicle is supposed to move next.

6. A parking assistance system configured to present a driver with information to assist an operation to park a vehicle in a predetermined target parking position, the system comprising:

a plurality of image capturing means each for capturing an image of a surrounding area of the vehicle; and image processing control means for changing viewpoints of the images captured by the plurality of image capturing means to generate an overhead image which is an image captured from right above the vehicle and causing predetermined display means to display a vehicle mark indicating actual position of the vehicle, a frame line corresponding to a target stop position to which the vehicle is supposed to move next, and a parking trajectory line leading to the stop position on the generated overhead image for each parking step, among parking trajectories for guiding the vehicle to the target parking position, wherein the target stop position is a position where the vehicle approaches with a steering wheel turned in one of a right turn position and a left turn position, where the steering wheel is turned from the one of the right turn position and the left turn position to the other of the right turn position and the left turn position, and where the vehicle leaves with the steering wheel turned in the other of the right turn position and the left turn position, wherein the frame line corresponding to the target stop position has a shape corresponding to an outline of the vehicle and has a larger width than a vehicle width of the vehicle, and wherein in a case where a shift signal of the vehicle represents any indication other than reverse, the image processing control means causes the display means to display the frame line of the target stop position to which the vehicle is supposed to move next and a parking trajectory line associated with a steering operation when a vehicle speed V is V>0, and to display the frame line of the target stop position to which the vehicle is supposed to move next, the parking trajectory line associated with a steering operation, and a frame line of the target parking position when the vehicle speed V is V=0, and in a case where the shift signal of the vehicle represents the reverse, the image processing control means causes the display means to display the frame line of the target stop position to which the vehicle is supposed to move next and the parking trajectory line associated with a steering operation when the vehicle speed V is V>0, and to display the frame line of the target stop position to which the vehicle is supposed to move next, a parking trajectory line of a steering instruction, and the frame line of the target parking position when the vehicle speed V is V=0.

7. The parking assistance system according to claim 6, wherein the image processing control means causes the display means to display the frame line of the target parking position only for a predetermined time period and then deletes the target parking position when the vehicle starts moving with the vehicle speed V transiting from V=O to V>0.

8. A parking assistance system configured to present a driver with information to assist an operation to park a vehicle in a predetermined target parking position, the system comprising:

a plurality of image capturing means each for capturing an image of a surrounding area of the vehicle; and image processing control means for changing viewpoints of the images captured by the plurality of image capturing means to generate an overhead image which is an image captured from right above the vehicle and causing predetermined display means to display a vehicle mark indicating actual position of the vehicle, a frame line corresponding to a target stop position to which the vehicle is supposed to move next, and a parking trajectory line leading to the stop position on the generated overhead image for each parking step, among parking trajectories for guiding the vehicle to the target parking position, wherein the target stop position is a position where the vehicle approaches with a steering wheel turned in one of a right turn position and a left turn position, where the steering wheel is turned from the one of the right turn position and the left turn position to the other of the right turn position and the left turn position, and where the vehicle leaves with the steering wheel turned in the other of the right turn position and the left turn position, wherein the frame line corresponding to the target stop position has a shape corresponding to an outline of the vehicle and has a larger width than a vehicle width of the vehicle, and wherein in a case where the target stop position to which the vehicle is supposed to move next is the target parking position, the image processing control means deletes the frame line of the target parking position displayed on the display means when the vehicle comes close to the target parking position.

9. A parking assistance system configured to present a driver with information to assist an operation to park a vehicle in a predetermined target parking position, the system comprising:

a plurality of image capturing means each for capturing an image of a surrounding area of the vehicle; and image processing control means for changing viewpoints of the images captured by the plurality of image capturing means to generate an overhead image which is an image captured from right above the vehicle and causing predetermined display means to display a vehicle mark indicating actual position of the vehicle, a frame line corresponding to a target stop position to which the vehicle is supposed to move next, and a parking trajectory line leading to the stop position on the generated overhead image for each parking step, among parking trajectories for guiding the vehicle to the target parking position, wherein the target stop position is a position where the vehicle approaches with a steering wheel turned in one of a right turn position and a left turn position, where the steering wheel is turned from the one of the right turn position and the left turn position to the other of the right turn position and the left turn position, and where the vehicle leaves with the steering wheel turned in the other of the right turn position and the left turn position, wherein the frame line corresponding to the target stop position has a shape corresponding to an outline of the vehicle and has a larger width than a vehicle width of the vehicle, and wherein the image processing control means causes the display means to display a steering association line among the parking trajectory lines in a way that a length of the steering association line becomes smaller as the vehicle comes close to the target stop position to which the vehicle is supposed to move next, the steering association line being a line associated with a steering operation.

* * * * *